No. 875,550. PATENTED DEC. 31, 1907.
J. McCORKELL.
THRESHING MACHINE.
APPLICATION FILED SEPT. 5, 1906.
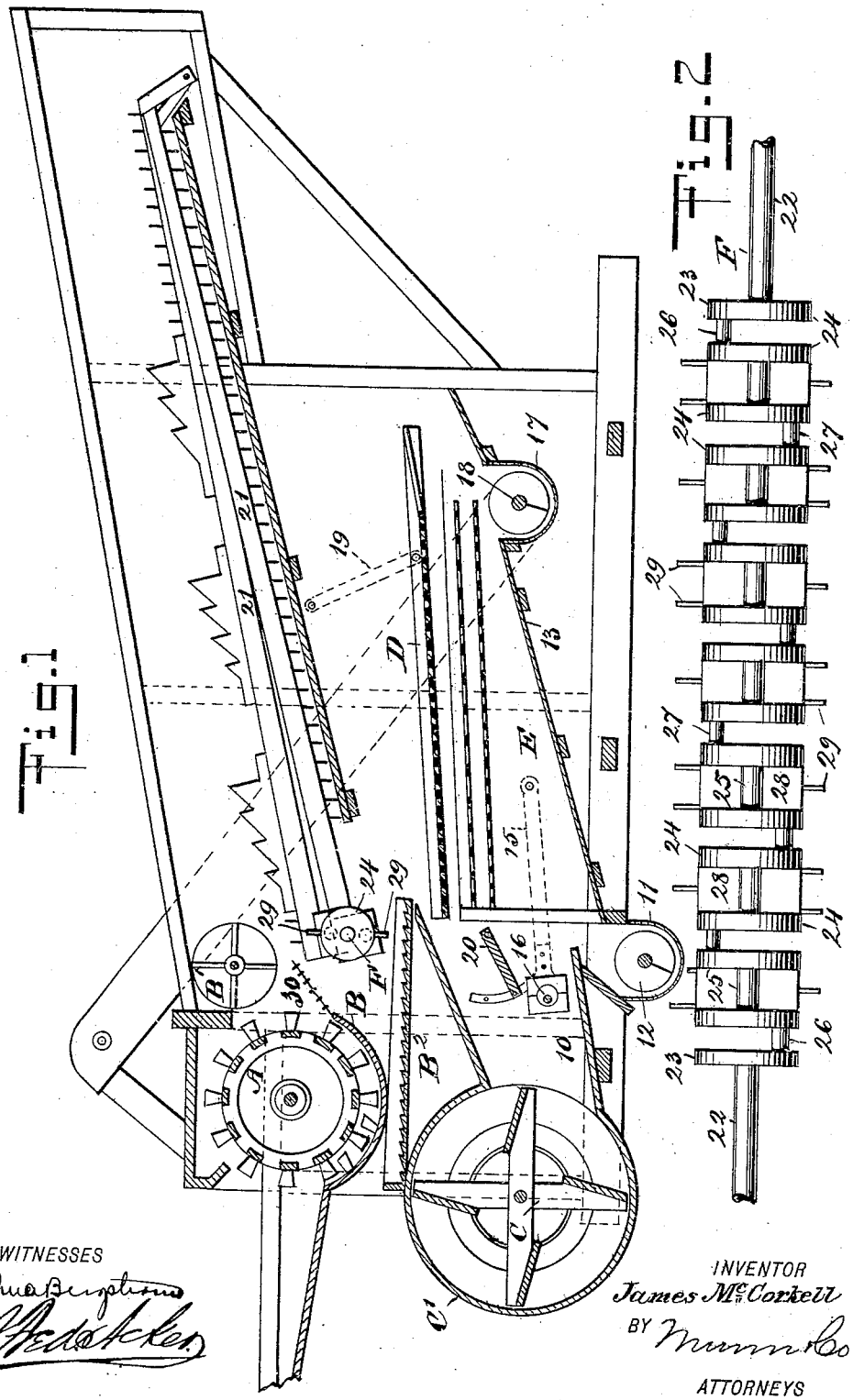
WITNESSES
INVENTOR
James McCorkell
BY Munn & Co
ATTORNEYS

UNITED STATES PATENT OFFICE.

JAMES McCORKELL, OF NEZPERCE, IDAHO.

THRESHING-MACHINE.

No. 875,550.      Specification of Letters Patent.      Patented Dec. 31, 1907.

Application filed September 5, 1906. Serial No. 333,333.

*To all whom it may concern:*

Be it known that I, JAMES MCCORKELL, a citizen of the United States, and a resident of Nezperce, in the county of Nez Perce and State of Idaho, have invented a new and Improved Threshing-Machine, of which the following is a full, clear, and exact description.

The purpose of the invention is to provide a machine which is extremely simple and economic in construction as well as light of draft, and which requires very little if any more than half the power required by other machines of the same capacity, and which will effect a thorough cleaning and effectually prevent smut mixing with the wheat in the event the grain is smutty.

A further purpose of the invention is to provide a machine of very large capacity, and one wherein it is impossible to overcrowd the cleaning sieves, and wherein a perfect separation of the straw is obtained and clogging behind the cylinder is rendered impossible.

The invention consists in the novel construction and combination of the several parts, as will be hereinafter fully set forth and pointed out in the claims.

Reference is to be had to the accompanying drawings forming a part of this specification, in which similar characters of reference indicate corresponding parts in all the figures.

Figure 1 is a longitudinal vertical section through the machine; and Fig. 2 is a detail plan view of the combined beater and crank shaft for the straw rakes.

A represents the cylinder of the machine, B the concave and B' one of the customary beaters located at the upper rear portion of the cylinder. A short grain pan $B^2$ is located below the concave, and below said grain pan and in advance of the center of the cylinder A the fan C and its casing C' are located. The throat 10 of the fan casing is opposite the forward lower end of a chaffer D, and the forward lower open end of a screening box E, the bottom 13 of which box is inclined downward and forward to a transverse trough 11 located beneath and in communication with the throat 10 of the fan casing, and in said trough 11 a conveyer 12 is mounted to revolve, adapted to carry off the cleaned grain.

The screening box E is provided with the customary sieves 14 and is reciprocated in any approved manner, as for example by links 15, actuated by a cam shaft 16. The screening box E moves to and from the trough 11 and a rear trough 17 at a greater elevation than the forward trough, which rear trough contains a conveyer 18, adapted to take off the tailings, smut and other foreign material delivered by the sieves 14.

The chaffer D is suspended by links 19, is reciprocated in any approved manner, and is located as usual above the sieves 14, its lower or forward end being beneath the rear or delivery end of the grain pan $B^2$; but a radical departure is made in the location of the chaffer D, inasmuch as its lower forward or receiving end is some distance below the delivery end of the grain pan, and the rear portion of the upper wall of the throat 10 of the fan casing C', as is shown in Fig. 1, so that the grain in passing from the grain pan $B^2$ to the chaffer D has a decided drop, and in dropping is subjected to the direct action of the currents of air from the fan C, which currents may be regulated relatively to the chaffer D and the screening box E by means of an adjustable damper 20 located at the delivery end of said throat 10.

By placing the fan C a little in advance of the cylinder A, the grain threshed at the cylinder and concave receives the full benefit of the air from said fan. It will be observed that the grain travels but a short distance over the grain pan $B^2$ to the chaffer D, and during its fall is exposed to the full blast from the fan C. This short travel of the grain in separation is a decided advantage over the old method of carrying the grain and chaff and any foreign matter that may be in the grain over a long pan and then dumping it upon the chaffer and sieves to be cleaned by the wind from the fan. The grain if so carried over long pans will be thoroughly mixed with chaff and smut and other foreign substances before it is acted upon by the blast from the fan; and if the grain be smutty the smut will so adhere to the kernels that it can not be separated with any degree of satisfaction therefrom, even when the strongest blast is brought to bear upon it.

By placing the fan at the front end of the machine slightly in advance of the cylinder, and the grain and foreign substances being immediately exposed to the blast of air from the fan and the smut, etc., thus not being ground in the grain, the grain and foreign matter are immediately separated in a most satisfactory manner. In fact, during the fall of the grain from the pan B² to the chaffer D, much of the smut and extraneous matter are blown entirely out from the grain and over the machine, never reaching the sieves at all; consequently, it is utterly impossible to overload the sieves.

The crank shaft F located to the rear of the cylinder A and below the beaters B and adapted to carry the rakes 21 is of peculiar construction as is shown in Fig. 2. It consists of terminals 22 adapted to turn in suitable bearings, end disks 23, to the central portions of which the terminals 22 are secured, and intermediate disks 24 arranged in pairs, each pair of disks being connected by a rod member 25 in longitudinal alinement with the terminals 22 of the shaft; and blocks 28 are located between the intermediate pairs of disks. From said blocks pins 29 project, constituting beater sections for the said shaft F, and the end disks 23 are connected with the opposing intermediate disks by short shaft sections 26, while the opposing disks of the other beaters for the intermediate disks are connected by short shaft sections 27. Said short sections 26 and 27 are alternately arranged at opposite sides of the shaft proper, that is to say the center of the terminals 22, and said short shaft sections 26 and 27 correspond to the ordinary crank arms of a crank shaft. On these crank members, as the short shaft sections may be termed, the rear ends of the rakes 21 are mounted.

The beaters B run in an opposite direction to the direction of rotation of the combined beater and crank shaft F, thus causing the straw to be taken from the threshing cylinder in a steady stream, rendering it impossible to clog the grain behind the cylinder, as is often the case in other machines, especially when the grain is exceedingly dry, under which condition the straw is liable to be chopped up and lie behind the cylinder, causing much annoyance and diminishing materially the capacity of said cylinder. The usual grating 30 extends from the concave over the forward ends of the rakes 21.

Having thus described my invention, I claim as new, and desire to secure by Letters Patent,—

1. In a threshing machine, the combination with the cylinder and concave and beaters mounted to revolve at the rear upper portion of the cylinder, of a combined crank and beater shaft mounted to revolve below the upper beaters and at the rear of the concave and cylinder, the crank arms of the combined crank and beater shaft being located between the beater sections of the said shaft, and rakes mounted at their forward ends upon the crank sections of the said combined shaft, the upper beaters being rotated in a direction opposite to the direction of rotation of the combined crank and beater shaft.

2. In a threshing machine, the combination with a concave and cylinder and beaters mounted to revolve at the rear upper portion of the cylinder, of a shaft mounted to revolve below the said beaters in a direction opposite to said beaters, which shaft consists of a series of crank sections and a series of interposed beater sections, rakes connected by one end to the crank sections the center of the beater sections being in alinement with the central portion of the terminals of the shaft, and pins carried by the said beater sections of said shaft, for the purpose set forth.

In testimony whereof I have signed my name to this specification in the presence of two subscribing witnesses.

JAMES McCORKELL.

Witnesses:
R. H. WALLACE,
HARRY W. TROUT